(12) United States Patent
Liu et al.

(10) Patent No.: US 10,619,339 B2
(45) Date of Patent: *Apr. 14, 2020

(54) SEWAGE TREATMENT DEVICE

(71) Applicant: Zhijun Wang, Shenzhen (CN)

(72) Inventors: Xiaojun Liu, Shenzhen (CN); Caixia Wang, Shenzhen (CN); Junlong Liu, Shenzhen (CN)

(73) Assignee: Zhijun Wang, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,596

(22) Filed: Nov. 2, 2018

(65) Prior Publication Data
US 2019/0249405 A1 Aug. 15, 2019

(30) Foreign Application Priority Data

Feb. 9, 2018 (CN) .......................... 2018 1 0132202

(51) Int. Cl.
C02F 1/00 (2006.01)
C02F 1/32 (2006.01)
(Continued)

(52) U.S. Cl.
CPC .............. E03F 1/006 (2013.01); B01D 29/15 (2013.01); C02F 3/006 (2013.01); C02F 9/00 (2013.01);
(Continued)

(58) Field of Classification Search
CPC ..... E03F 1/006; E03F 5/22; E03F 3/02; F04B 43/113; F04B 49/04; F04D 9/042; B65D 88/22; C02F 9/00; C02F 1/78; C02F 1/42; C02F 2001/425; C02F 2209/40; C02F 2303/04; C02F 1/325; C02F 2209/06;
(Continued)

(56) References Cited

U.S. PATENT DOCUMENTS 4,936,986 A * 6/1990 Tarves, Jr. ......... B01D 17/0217
210/321.64
2011/0155564 A1 * 6/2011 Oifman .............. B01D 21/0003
204/230.2

(Continued)

FOREIGN PATENT DOCUMENTS

| CN | 201268644 | * | 7/2009 | ............... C02F 9/12 |
| CN | 107265733 | * | 10/2017 | ............... C02F 9/10 |

Primary Examiner — Nam X Nguyen
Assistant Examiner — Ekandra S. Miller-Cruz

(57) ABSTRACT

A sewage treatment device includes a stirring structure, a filter box, a tank filter, and a detection structure which are connected in sequence. Conveying pipelines are connected to an exterior of the stirring structure to convey sewage to an interior of the stirring structure. First water pumps are connected to the conveying pipelines to provide conveying power. An upper-layer stirrer assembly, a lower-layer stirrer assembly and a rotating shaft configured to install the upper-layer stirrer assembly and the lower-layer stirrer assembly are arranged in the interior of the stirring structure. A lifting driving cylinder drives the upper-layer stirrer assembly and the lower-layer stirrer assembly to move up and down. The upper-layer stirrer assembly includes an engaging block axially engaged with the rotating shaft and stirring blades arranged around the periphery of the engaging block at equal intervals.

5 Claims, 4 Drawing Sheets

(51) Int. Cl.
    *C02F 1/42*     (2006.01)
    *C02F 1/02*     (2006.01)
    *E03F 1/00*     (2006.01)
    *B01D 29/15*     (2006.01)
    *C02F 9/00*     (2006.01)
    *C02F 3/00*     (2006.01)
    *C02F 1/28*     (2006.01)

(52) U.S. Cl.
    CPC ........ *B01D 2201/309* (2013.01); *C02F 1/001* (2013.01); *C02F 1/02* (2013.01); *C02F 1/283* (2013.01); *C02F 1/32* (2013.01); *C02F 2201/002* (2013.01); *C02F 2209/06* (2013.01); *C02F 2209/40* (2013.01); *C02F 2209/42* (2013.01)

(58) Field of Classification Search
    CPC ...... C02F 2209/42; C02F 1/283; C02F 1/004; C02F 2209/008; C02F 1/46; B01D 39/16; B01D 39/2068; B01D 24/00; B01D 24/042; B01D 24/045; B01D 24/105; B01D 24/12; B01D 24/18; B01D 24/205; B01D 29/0002; B01D 29/0095; B01D 29/60; B01D 29/601–608; B01D 29/682; B01D 29/82; B01D 29/824; B01D 2201/00
    USPC ........ 210/386, 391, 395, 396, 112, 533–535, 210/323.1, 324, 331, 340; 137/386, 391, 137/393, 395, 396
    See application file for complete search history.

(56) References Cited

U.S. PATENT DOCUMENTS

2012/0012525 A1\* 1/2012 Kuang ............... C02F 9/00
                                                  210/605
2013/0168327 A1\* 7/2013 Clark ............... G01N 21/77
                                                  210/739

\* cited by examiner

US 10,619,339 B2

SEWAGE TREATMENT DEVICE

BACKGROUND

1. Field

The present disclosure relates to the field of sewage treatment device technology, and in particular to a sewage treatment device that is convenient to install and has high sewage treatment efficiency, simple structure, and low power consumption.

2. Description of Prior Art

Water shortage, population increase, and the rapid development of economic increasing the level of water environment pollution in China. With the continuous development of agriculture, especially the frequent use of pesticides and chemical fertilizers, this makes a problem of rural sewage treatment particularly serious. Moreover, in rural areas, especially in remote areas, houses are relatively scarce, and natural conditions and economic conditions vary widely. Thus, it is impossible to adopt a unified sewage treatment model. Further, construction of large-scale sewage treatment facilities in rural areas not only covers a large area, but also has a large odor, and construction cost is high, and it takes a lot of electricity. Small rural decentralized sewage treatment devices are able to solve these problems. The small rural decentralized sewage treatment devices are capable of realizing the on-site treatment of sewage, and do not need to build long pipelines. Moreover, they are easy in install, simple in maintenance and occupy a small floor space, and further save investments in pipe network and have a strong water quality adaptability.

With the continuous improvement of the level of intelligence, how to meet the current state of intelligence, how to combine sewage purification equipment and intelligence and improve the recovery rate are frequently considered by those skilled in the art. A lot of research, development and experiments have been carried out, and a good result has been obtained.

SUMMARY

In order to overcome the problems existing in the prior art, the present disclosure provides a sewage treatment device convenient to install and has high sewage treatment efficiency, simple structure and low power consumption.

Compared with the prior art, the present disclosure of the sewage treatment device with simple structure and low power consumption comprises a stirring structure, a filter box, a tank filter and a detection structure. The stirring structure, the filter box, the tank filter and the detection structure are connected in sequence. Conveying pipelines are connected to an exterior of the stirring structure to convey sewage to an interior of the stirring structure. Water pumps are connected to the conveying pipelines to provide conveying power. An upper-layer stirrer assembly and a lower-layer stirrer assembly are arranged in the interior of the stirring structure. A rotating shaft is arranged in the interior of the stirring structure to install the upper-layer stirrer assembly and the lower-layer stirrer assembly. Combined with an internal structure design of the filter box, the tank filter and the detection structure, the sewage treatment device is able to efficiently filter and clean the sewage, and is good in use effect, and is suitable for widespread use.

DETAILED DESCRIPTION

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
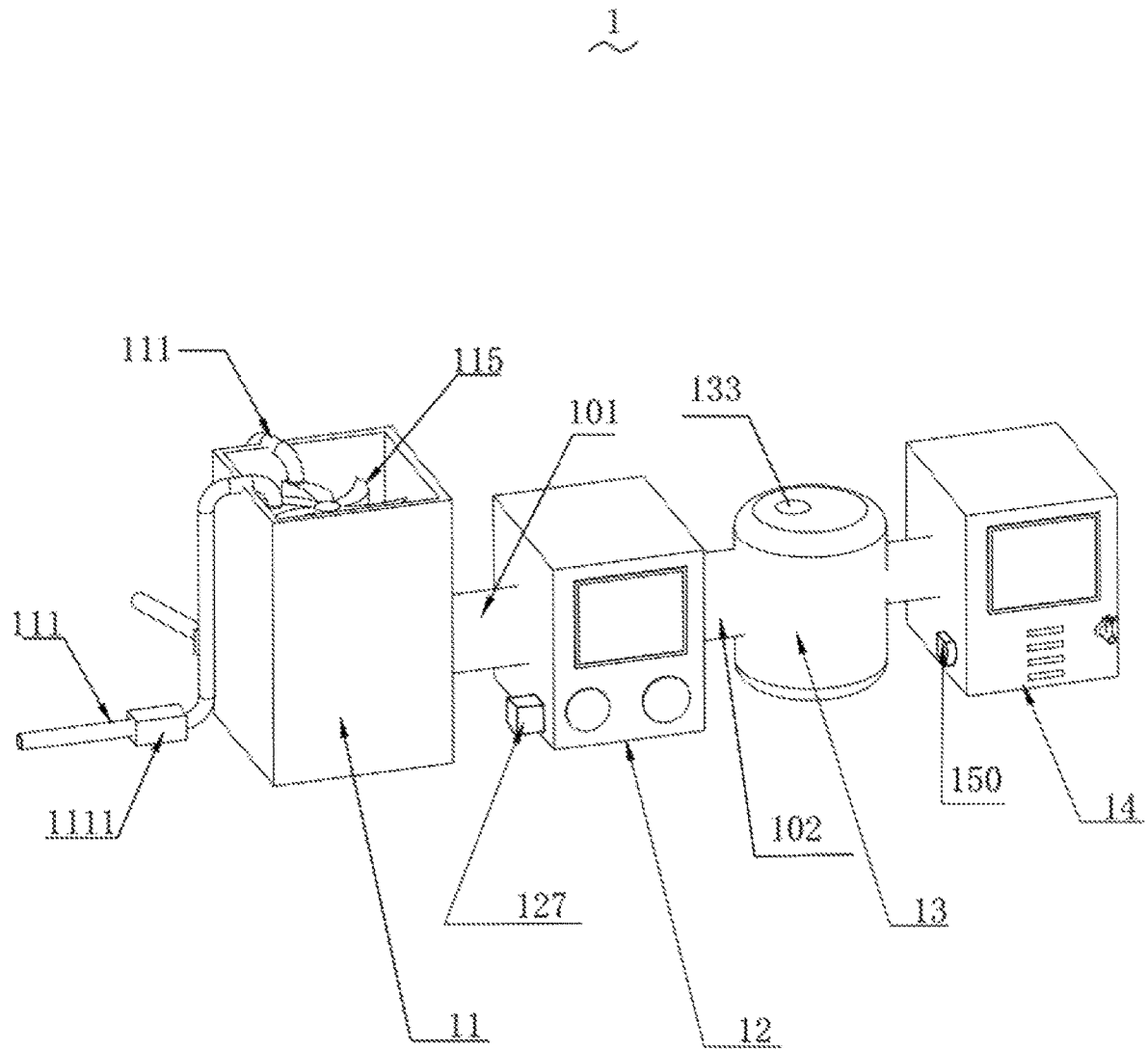
FIG. 1 is a perspective view showing a structure diagram of a sewage treatment device of the present disclosure.
Figure 2:
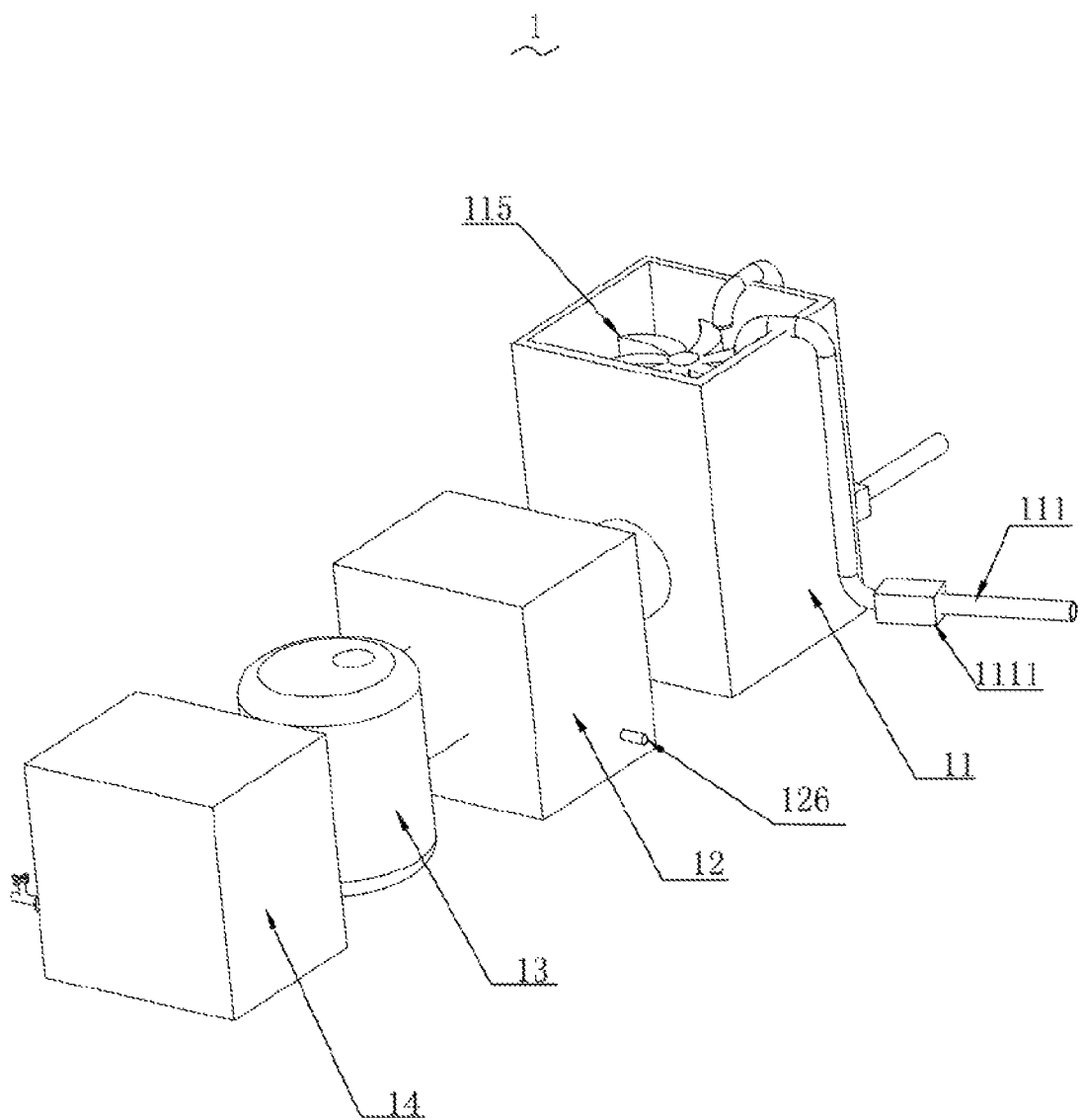
FIG. 2 is another perspective view showing a structure diagram of the sewage treatment device of the present disclosure.
Figure 3:
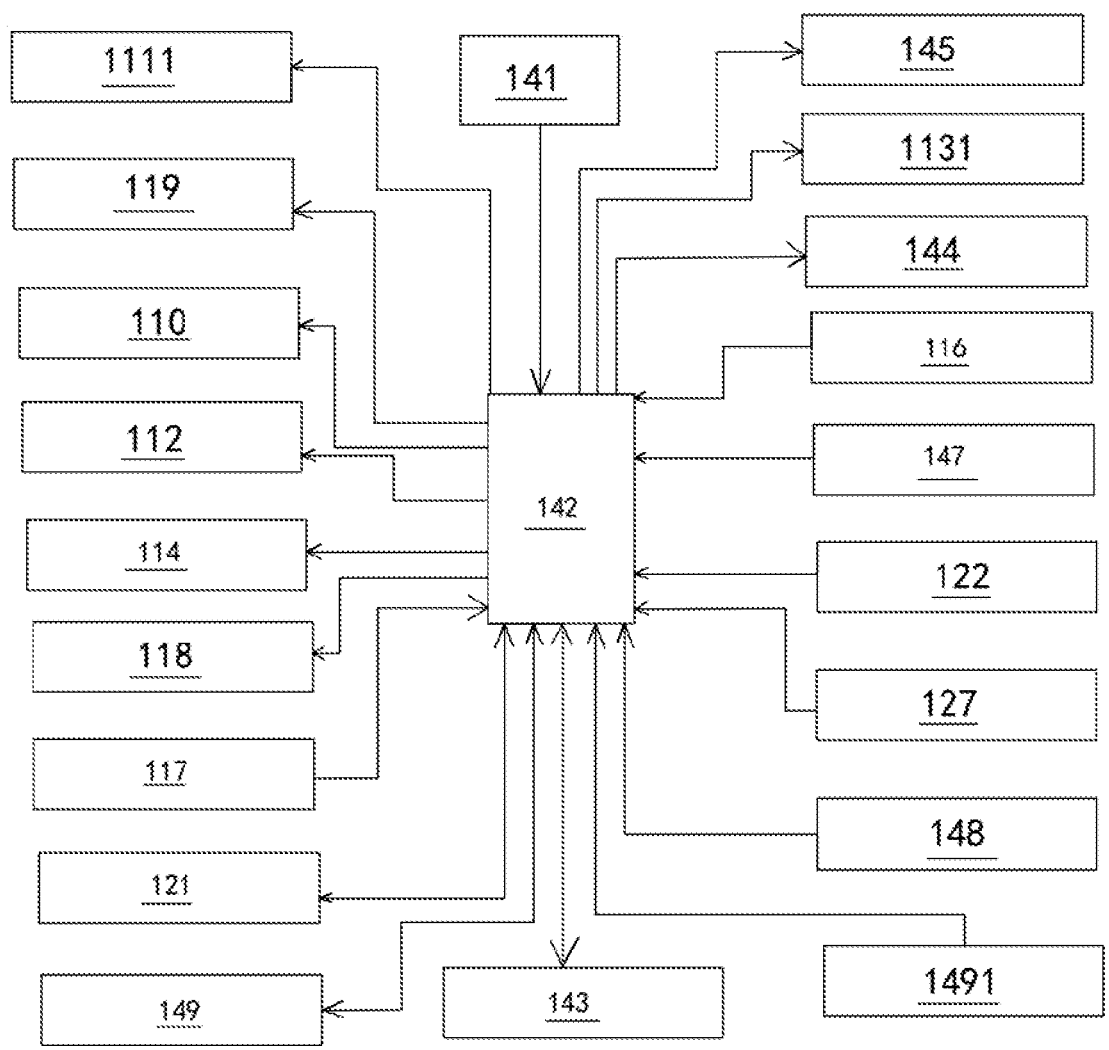
FIG. 3 is a structure diagram of the sewage treatment device of the present disclosure.
Figure 4:
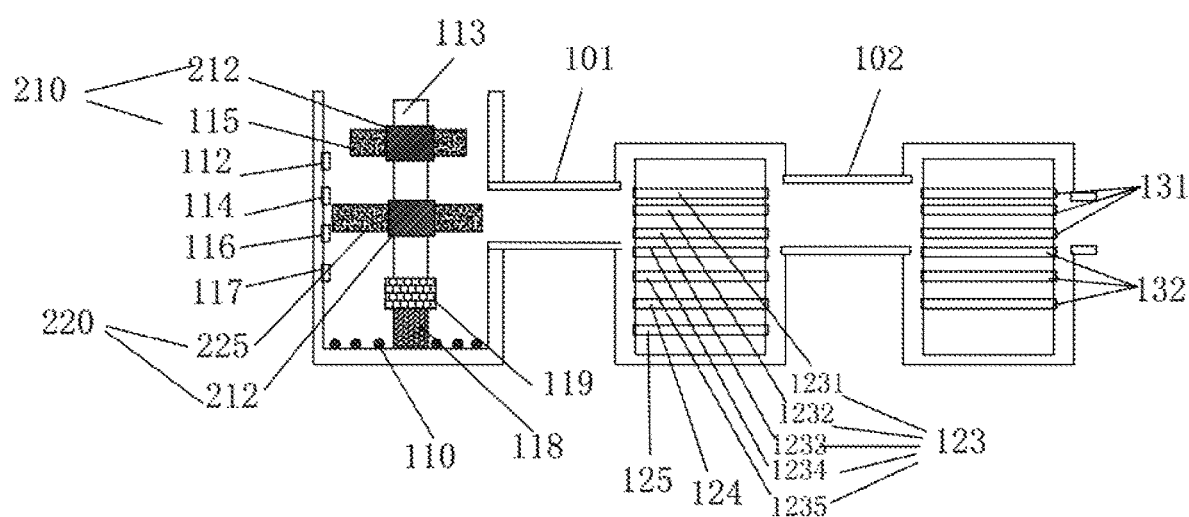
FIG. 4 is a cross section view of a stirring structure, a filter box, and a tank filter of the present disclosure.

As shown in FIG. 1 to FIG. 4, the present disclosure of a sewage treatment device 1 with simple structure and low power consumption comprises a stirring structure 11, a filter box 12, a tank filter 13 and a detection structure 14. The stirring structure 11, the filter box 12, the tank filter 13 and the detection structure 14 are connected in sequence. Conveying pipelines 111 are connected to an exterior of the stirring structure 11 to convey sewage to an interior of the stirring structure 11. Water pumps 1111 are connected to the conveying pipelines 111 to provide conveying power. An upper-layer stirrer assembly 110 and a lower-layer stirrer assembly 120 are arranged in the interior of the stirring structure 11. A rotating shaft 113 is arranged in the interior of the stirring structure II to install the upper-layer stirrer assembly 110 and the lower-layer stirrer assembly 120.

The sewage treatment device 1 further comprises a lifting driving cylinder 119 to drive the upper-layer stirrer assembly 110 and the lower-layer stirrer assembly 120 to move up and down. The upper-layer stirrer assembly 110 comprises an engaging block 212 axially engaged with the rotating shaft 113 and a plurality of stirring blades 115 arranged around the periphery of the engaging block 212 at equal intervals. A structure of the lower-layer stirrer assembly 120 is same as a structure of the upper-layer stirrer assembly 110. And stirring blades 225 of the lower-layer stirrer assembly 120 are larger than the stirring blades 115 of the upper-layer stirrer assembly 110. An aeration pipe assembly 110 is arranged at a bottom portion of the stirring structure 11.

The sewage treatment device 1 further comprises a first intermediate pipeline 101 configured to communicate the stirring structure 11 with the filter box 12. A diameter of the first intermediate pipeline 101 ranges from 15-20 cm. A dosing device 112, a heater 114, a first liquid level sensor 116, a first PH detector 117, and a first rotary drive motor 118 are arranged in the interior of the stirring structure 11. And the first rotary drive motor 118 drives the rotating shaft 113 to rotate. A plurality of filter plates 123, a PVC (polyvinyl chloride) filter layer 125 and a gauze filter layer 125 are arranged inside the filter box 12. The filter plates comprise an activated carbon filter plate 1231, a quartz sand filter plate 1232, a sponge filter plate 1233, a cobble filter layer 1234 and an anthracite filter plate 1235. And the activated carbon filter plate 1231, the quartz sand filter plate 1232, the sponge filter plate 1233, the cobble filter layer 1234, and the anthracite filter plate 1235 are sequentially reduced in thickness. A thickness of the activated carbon filter plate 1231 ranges from 7.1-6.9 cm. A thickness of the quartz sand filter plate 1232 ranges from 5.8-6.7 cm. A thickness of the sponge filter plate 1233 ranges from 4.9-5.5 cm. A thickness of the cobble filter layer 1234 ranges from 4.3-4.8 cm. A thickness of the anthracite filter plate 1235 ranges from 3.3-4.2 cm.

The sewage treatment device 1 further comprises a first touch display screen 121 and two control buttons 122, and the first touch display screen 121 and two control buttons 122 are arranged on an exterior of the filter box 12. A back side of the filter box 12 defines a sewage cleaning opening 126. A plurality of vermiculite powder filter plates 131 and several biological black charcoal filter plates 132 are sequentially arranged inside the tank filter 13 from top to bottom. And a service port 133 is arranged at an upper portion of the tank filter 13. A thickness of the vermiculite powder filter plate 131 ranges from 2.4-3.5 cm; a thickness of the biological black charcoal filter plate 132 ranges from 3.3-5.5 cm. And each biological black charcoal filter plate 132 defines a plurality of filter holes. An aperture of the filter hole of the biological black charcoal filter plate 132 ranges from 1.1-1.5 mm. Each vermiculite powder filter plate 131 also defines a plurality of filter holes. An aperture of the filter hole of the vermiculite powder filter plate 131 ranges from 0.8-1.1 mm. The filter box 12 is connected with the tank filter 13 through a second intermediate pipeline 102. A diameter of the second intermediate pipeline 102 ranges from 22-33 cm. A power supply 141, a controller 142, a wireless communication transmission unit 143, an UV (ultraviolet) sterilizing lamp 144, a second PH value detector 146, a second liquid level sensor 147, and a water quality sensor 148 are arranged inside the detection structure 14.

The water pumps 1111, the lifting driving cylinder 119, the aeration pipe assembly 110, the dosing device 112, the heater 114, the first rotary drive motor 118, the first touch display screen 121, the control buttons 122, the wire communication transmission unit 143, the UV sterilizing lamp 144, the second PH value detector 146, the first liquid level sensor 116, the second liquid sensor 147, and the water quality sensor 148 are electrically connected with the controller 142.

A second touch display screen 149 and a faucet are arranged on a front side of the detection structure 14. A flow detector 1491 is arranged at the faucet; the second touch display screen 149 and the flow detector 1491 are electrically connected with the controller 142.

The present disclosure of the sewage treatment device 1 comprises the stirring structure 11, the filter box 12, the tank filter 13 and the detection structure 14. The stirring structure 11, the filter box 12, the tank filter 13 and the detection structure 14 are connected in sequence. Conveying pipelines 111 are connected to the exterior of the stirring structure 11 to convey sewage to the interior of the stirring structure 11. Water pumps 1111 are connected to the conveying pipelines 111 to provide conveying power. The upper-layer stirrer assembly 110 and the lower-layer stirrer assembly 120 are arranged in the interior of the stirring structure 11. The rotating shaft 113 is arranged in the interior of the stirring structure 11 to install the upper-layer stirrer assembly 110 and the lower-layer stirrer assembly 120. Combined with an internal structure design of the filter box 12, the tank filter 13 and the detection structure 14, the sewage treatment device 1 is able to efficiently filter and clean the sewage, and is good in use effect, and is suitable for widespread use.

Furthermore, the aeration pipe assembly 110 is arranged on an inner wall of the bottom portion of the stirring structure 11 in a multi-tube spiral shape.

Furthermore, an electrode purifier 127 is electrically connected with the controller 142 and is arranged inside the filter box 12.

Furthermore, the tank filter 13 is of a cylindrical shape, and an outer diameter of the tank filter 13 ranges from 70-150 cm.

Furthermore, the first touch display screen 121 and the second touch display screen 149 are capacitive touch display screens.

Furthermore, an alerter 150 is arranged on the detection structure 14.

Compared with the prior art, the present disclosure of the sewage treatment device 1 comprises the stirring structure 11, the filter box 12, the tank filter 13 and the detection structure 14. The stirring structure 11, the filter box 12, the tank filter 13 and the detection structure 14 are connected in sequence. Conveying pipelines 111 are connected to the exterior of the stirring structure 11 to convey sewage to the interior of the stirring structure 11. Water pumps 1111 are connected to the conveying pipelines 111 to provide conveying power. The upper-layer stirrer assembly 110 and the lower-layer stirrer assembly 120 are arranged in the interior of the stirring structure 11. The rotating shaft 113 is arranged in the interior of the stirring structure 11 to install the upper-layer stirrer assembly 110 and the lower-layer stirrer assembly 120. Combined with the internal structure design of the filter box 12, the tank filter 13 and the detection structure 14, the sewage treatment device 1 is able to efficiently filter and clean the sewage, and is good in use effect, and is suitable for widespread use.

The above-described embodiments of the present disclosure are not to be construed as limiting the scope of the present disclosure. Any of the modifications, equivalent replacement, and improvement within the spirit and principle of the present disclosure should fall within the protection scope of the claims.

What is claimed is:

1. A sewage treatment device, comprising:
   a stirring structure;
   a filter box;
   a tank filter; and
   a detection structure;
   wherein the stirring structure, the filter box, the tank filter, and the detection structure are connected in sequence; conveying pipelines are connected to an exterior of the stirring structure to convey sewage to an interior of the stirring structure: water pumps are connected to the conveying pipelines to provide conveying power; an upper-layer stirrer assembly and a lower-layer stirrer assembly are arranged in the interior of the stirring structure; a rotating shaft is arranged in the interior of the stirring structure to install the upper-layer stirrer assembly and the lower-layer stirrer assembly,
   wherein the sewage treatment device further comprises a lifting driving cylinder to drive the upper-layer stirrer assembly and the lower-layer stirrer assembly to move up and down; the upper-layer stirrer assembly comprises an engaging block axially engaged with the rotating shaft and a plurality of stirring blades arranged around the periphery of the engaging block at equal intervals; a structure of the lower-layer stirrer assembly is same as a structure of the upper-layer stirrer assembly; and stirring blades of the lower-layer stirrer assembly are larger than the stirring blades of the upper-layer stirrer assembly, an aeration pipe assembly is arranged at a bottom portion of the stirring structure;

wherein the sewage treatment device further comprises a first intermediate pipeline configured to communicate the stirring structure with the filter box; a diameter of the first intermediate pipe pipeline ranges from 15 cm to 20 cm; a dosing device, a heater, a first liquid level sensor, a first PH detector and a first rotary drive motor are arranged in the interior of the stirring structure; and the first rotary drive motor drives the rotating shaft to rotate; a plurality of filter plates, a PVC (polyvinyl chloride) filter layer and a gauze filter layer are arranged inside the filter box; the filter plates comprise an activated carbon filter plate, a quartz sand filter plate, a sponge filter plate, a cobble filter layer and an anthracite filter plate; and the activated carbon filter plate, the quartz sand filter plate, the sponge filter plate, the cobble filter layer and the anthracite filter plate are sequentially reduced in thickness; a thickness of the activated carbon filter plate ranges from 7.1-6.9 cm; a thickness of the quartz sand filter plate ranges from 5.8-6.7 cm; a thickness of the sponge filter plate ranges from 4.9-5.5 cm; a thickness of the cobble filter layer ranges from 4.3-4.8 cm; a thickness of the anthracite filter plate ranges from 3.3-4.2 cm;

wherein the sewage treatment device further comprises a first touch display screen and two control buttons; the first touch display screen and two control buttons are arranged on an exterior of the filter box; a back side of the filter box defines a sewage cleaning opening; a plurality of vermiculite powder filter plates and several biological black charcoal filter plates are sequentially arranged inside the tank filter from top to bottom; and a service port is arranged at an upper portion of the tank filter; a thickness of the vermiculite powder filter plate ranges from 2.4-3.5 cm; a thickness of the biological black charcoal filter plate ranges from 3.3-5.5 cm; and each biological black charcoal filter plate defines a plurality of filter holes; an aperture of the filter hole of the biological black charcoal filter plate ranges from 1.1-1.5 mm; each vermiculite powder filter plate also defines a plurality of filter holes; an aperture of the filter hole of the vermiculite powder filter plate ranges from 0.8-1.1 mm; the filter box is connected with the tank filter through a second intermediate pipeline; and a diameter of the second intermediate pipeline ranges from 22-33 cm; a power supply, a controller, a wireless communication transmission unit, a UV (ultraviolet) sterilizing lamp, a second PH detector, a second liquid level sensor, and a water quality sensor are arranged inside the detection structure;

wherein the water pumps, the lifting driving cylinder, the aeration pipe assembly, the dosing device, the heater, the first rotary drive motor, the first touch display screen, the control buttons, the wireless communication transmission unit, the UV sterilizing lamp, the second PH detector, the first liquid level sensor, the second liquid sensor, and the water quality sensor are electrically connected with the controller;

wherein a second touch display screen and a faucet are arranged on a front side of the detection structure; a flow detector is arranged at the faucet; the second touch display screen and the flow detector are electrically connected with the controller;

wherein the aeration pipe assembly is arranged on an inner wall of the bottom portion of the stirring structure in a multi-tube spiral shape.

2. The sewage treatment device according to claim 1, wherein an electrode purifier is electrically connected with the controller and is arranged inside the filter box.

3. The sewage treatment device according to claim 1, wherein the tank filter is of a cylindrical shape, and an outer diameter of the tank filter ranges from 70-150 cm.

4. The sewage treatment device according to claim 1, wherein the first touch display screen and the second touch display screen are capacitive touch display screens.

5. The sewage treatment device according to claim 1, wherein an alerter is arranged on the detection structure.

* * * * *